Nov. 14, 1939.  F. N. JACOB  2,180,207

MACHINE FOR WINDING DUOLATERAL ELECTRICAL COILS

Filed Feb. 1, 1936  5 Sheets-Sheet 1

INVENTOR.
FREDERICK N. JACOB
BY Clemens H. Vig,
ATTORNEY.

Nov. 14, 1939.  F. N. JACOB  2,180,207
MACHINE FOR WINDING DUOLATERAL ELECTRICAL COILS
Filed Feb. 1, 1936  5 Sheets-Sheet 3

INVENTOR.
FREDERICK N. JACOB.
BY
Clemens H. Vig,
ATTORNEY.

Nov. 14, 1939.　　　F. N. JACOB　　　2,180,207
MACHINE FOR WINDING DUOLATERAL ELECTRICAL COILS
Filed Feb. 1, 1936　　　5 Sheets-Sheet 4

INVENTOR.
FREDERICK N. JACOB.
BY Clemens H. Vig,
ATTORNEY.

Nov. 14, 1939.  F. N. JACOB  2,180,207
MACHINE FOR WINDING DUOLATERAL ELECTRICAL COILS
Filed Feb. 1, 1936    5 Sheets-Sheet 5

INVENTOR.
FREDERICK N. JACOB.

BY Clemens H. Vig,
ATTORNEY.

Patented Nov. 14, 1939

2,180,207

UNITED STATES PATENT OFFICE 2,180,207

MACHINE FOR WINDING DUOLATERAL ELECTRICAL COILS

Frederick N. Jacob, Chicago, Ill., assignor to Johnson Laboratories, Inc., Chicago, Ill., a corporation of Illinois Application February 1, 1936, Serial No. 61,874

13 Claims. (Cl. 242—9)

My invention relates to an improved machine for winding electrical coils, particularly of the duolateral type. An important part of my machine is cam mechanism and adjusting devices by which coils of different lengths axially, may be wound by means of the same cam. My machine also is provided with devices by which coils of the type referred to, may each be wound in sections, or pi form.

As a result of my improved construction, the traverse of the wire of which the coils are wound, is accurately effected from end to end of the coil, regardless of the length of the coils axially, and said traverse may be effected as many times as desired per turn of the winding, depending upon the size and proportions of the coil being wound.

My invention will be best understood by reference to the accompanying drawings illustrating the above and other objects thereof, in which—

Fig. 11 is a vertical, sectional view to an enlarged scale, of a part of the structure shown in Fig. 1, taken along the line 11—11.

Similar numerals refer to similar parts throughout the several views.

Figure 1:
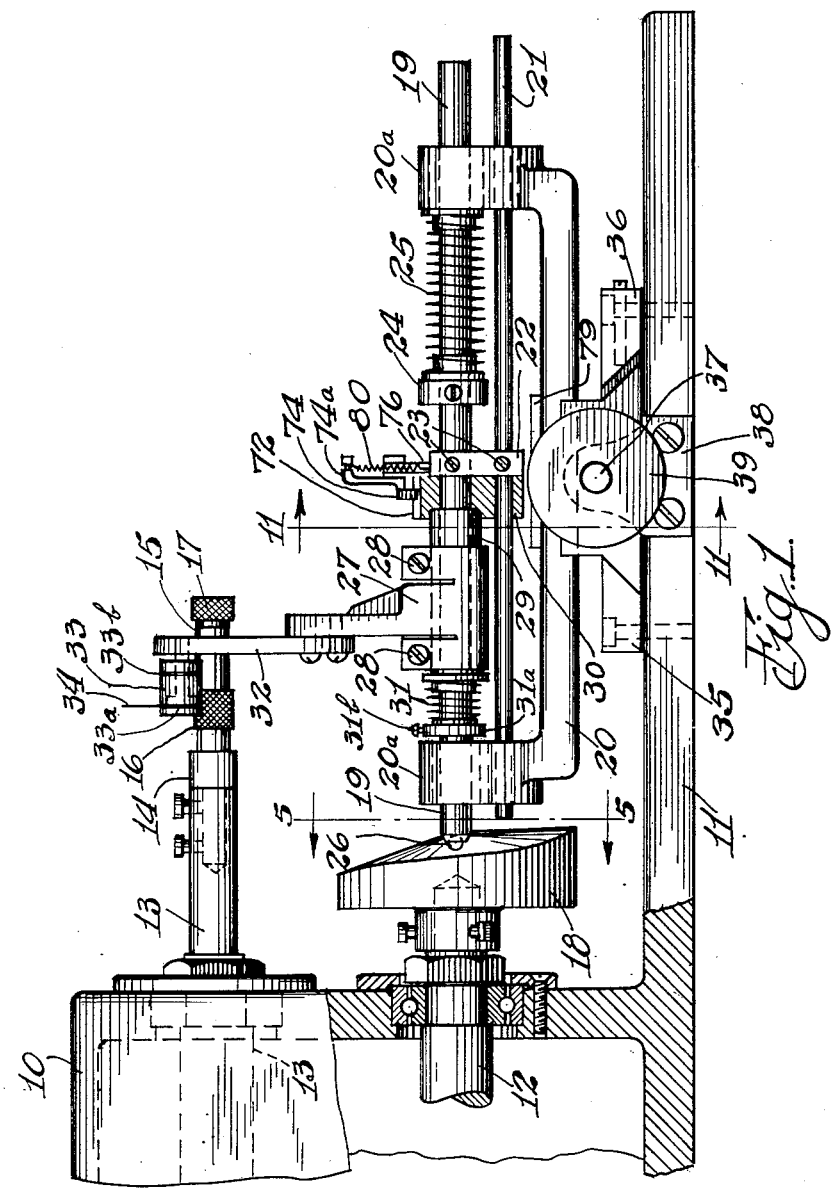
Fig. 1 shows the winding mechanism of my machine in front elevation, as well as part of the housing containing the driving mechanism of the machine.

As shown in Fig. 1, my machine consists of a housing 10 from the right hand end of which a base 11 extends to support the winding mechanism. The housing 10 supports a cam shaft 12 and a winding shaft 13, each in suitable bearings carried by the end walls of the housing. The winding shaft 13 carries at its right hand end, a winding spindle 14 to support the core 15 of the coil 16 being wound, said core being held against rotation on said spindle by a thumb nut 17. The cam shaft 12 carries on its right hand end, a cam 18 having an end cam surface against which the left hand end of a follower rod 19 rests, which rod is supported for longitudinal, reciprocating movement in bushings carried by the upwardly extending end arms 20a of a carriage 20.

The shafts 12 and 13 are horizontal and substantially parallel, and the follower rod 19 is also horizontal and substantially parallel with the axes of the shafts 12 and 13, the center line of the follower rod 19 being preferably at the same distance from the base 11, as is the center line of the cam shaft 12 and cam 18. Below the rod 19, the carriage arms 20a support in bushings therefor, a guide rod 21 substantially parallel with the follower rod 19, said rod 21 being free to move longitudinally in its said supports. The rods 19 and 21 extend through a yoke 22 located between the arms 20a, which yoke is rigidly secured to said rods, for example, by set screws 23. The rod 19 has secured thereto between the yoke 22 and the right hand arm 20a, a collar 24 between which and said right hand arm, a compression spring 25 is disposed around said rod, to hold said rod as far to the left as the cam 18 will permit. The end of the rod 19 adjacent the cam 18, is provided with an anti-friction ball 26, preferably of hardened steel, to reduce to a minimum by its rotation in the end of the rod 19, the friction resulting from the engagement of the follower rod with the rotating end surface of the cam 18.

The rod 19 carries between the yoke 22 and the left hand arm 20a, a bracket 27 on a sleeve 29 and secured to said sleeve by clamping screws 28, said sleeve being a sliding fit on the rod and capable of angular and longitudinal movement thereon. The right hand end of the sleeve 29 rests against a spacing cam 30 which in turn rests against the yoke 22, there being a compression spring 31 around the rod 19, between the other end of said sleeve and a collar 31a secured to the rod 19 by a set screw 31b, holding said sleeve 29 as far to the right as the spacing cam 30 will permit.

The bracket 27 carries an upwardly extending arm 32 on the upper end of which a rotary guiding roller or equivalent wire guiding device 33 is supported, having a groove 33a to lead the winding wire 34 to the coil 16. The cam 30, the sleeve 29, the bracket 27 and the wire guide 33 thus move with the follower rod 19 and to the same extent, when the latter is reciprocated by the cam 18.

Figure 6:
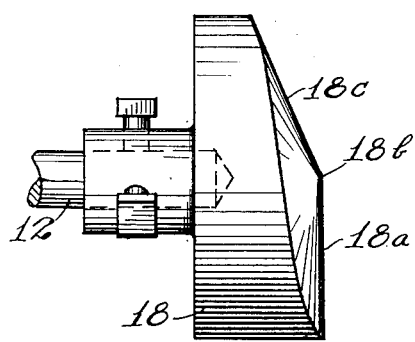
Fig. 6 shows the cam structure of Fig. 5, in side elevation.
Figure 5:
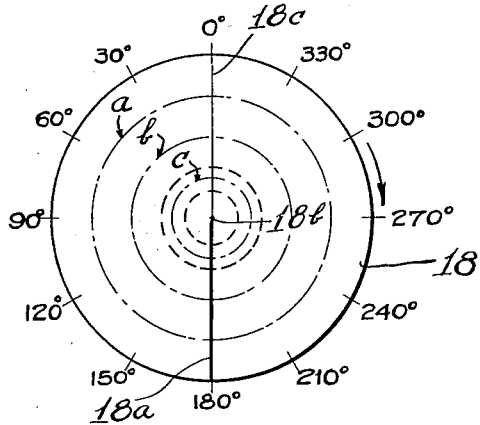
Fig. 5 shows to an enlarged scale and in end elevation, the cam illustrated in Fig. 1 to control the guiding of the winding wire to the coil being wound, this view being taken along the line 5—5 in Fig. 1.
Figure 7:
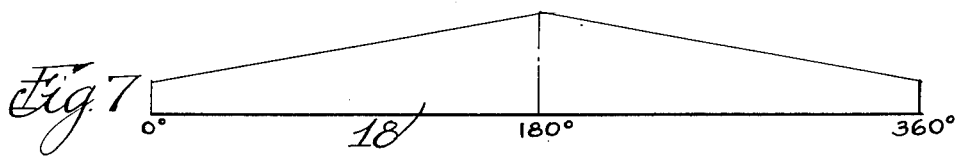
Figs. 7, 8, 9 and 10 are developed views of the cam surface of the cam shown in Figs. 5 and 6, at different radii of said surface, to illustrate respectively the different amounts of movement of the cam follower when moving along the paths of travel illustrated in Figs. 7 to 10 inclusive, in winding coils of different axial lengths with the same cam.
Figure 8:
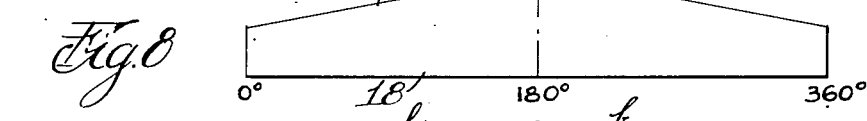
Figure 9:
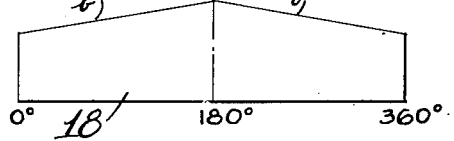
Figure 10:
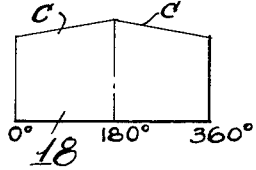

As more clearly shown in Figs. 5 and 6, the end surface of the cam 18 is made so its lowest point is at its outer edge at the position marked 0° in Fig. 5, and its highest point is at its outer edge at the position marked 180° in Fig. 5. The rate of change of elevation of the cam surface is preferably proportional to the angular displacement from 0°, so the intersection of the cam surface with the outer, cylindrical surface of the cam is helical and ascending in either direction around said cylindrical surface, from 0° to 180°. The highest point above referred to, is connected with the axis or center line of the cam, by a radial, straight line 18a of the cam surface, which line 18a is perpendicular to said center line, as a result of which any point in the line 18a, is of the same cam elevation as any other point therein. The intersection of the line 18a, with the center line of the cam, is the center 18b of the cam surface and is connected by an inclined straight line 18c with the low point of the cam surface at 0°, above referred to. The cam surface is made up of successive straight lines extending from successive points in the helical intersection of the cam surface with the cylindrical surface of the cam, to the center 18b of the cam surface. The cam surface thus produced, affords many possible paths of travel of the follower rod 19 on said cam surface, at different distances from the center 18b of the cam surface, with different total displacements of the follower rod 19 axially, which are proportional to the distances of the paths from the center 18b, because, although the high points of said paths are the same since they are all in the line 18a, the low points of said paths are all in the line 18c, and said low point has a continuously greater elevation relatively to the lowest point of said cam surface, as the distance of its path of travel from the center 18b is decreased. Furthermore, for any said path of travel, the displacement axially of the follower rod 19 from instant to instant, is proportional to the amount of angular movement of the cam relatively to the follower 19. The relations described are ilustrated in Figs. 7, 8, 9 and 10, Fig. 7 showing in developed view the path of the follower rod 19 at the outer edge of the cam surface, and Figs. 8, 9 and 10 similarly showing the paths of travel indicated by the broken line circles a, b and c respectively in Fig. 5.

Figure 2:
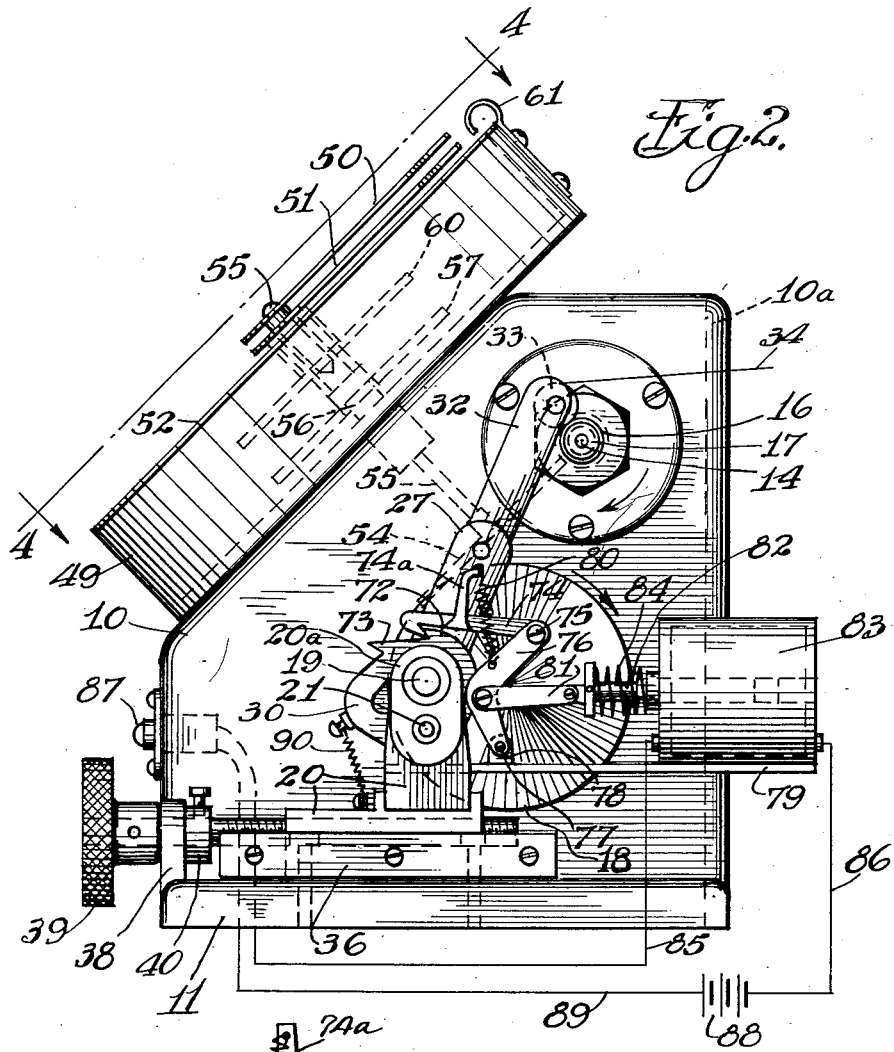
Fig. 2 is a right hand end elevation of the parts shown in Fig. 1.

In my machine I provide means for moving the follower rod 19 across the cam surface of the cam 18, to secure any said path of travel on the cam surface, as follows: As shown in Figs. 1 and 2, the carriage 20 is mounted on the base 11 in guideways 35 and 36 which are preferably horizontal and substantially at right angles to the axes of the shafts 12 and 13 and of the follower rod 19. The carriage 20 is engaged by a feed screw 37 parallel with the guideways 35 and 36 and extending at its forward end, through a bracket 38 extending upwardly from the base 11, said feed screw having a hand knob 39 secured to its outer end, and carrying a collar 40 secured to said feed screw just back of said bracket 38, said knob and said collar preventing longitudinal movement of said feed screw through said bracket without interfering with rotation of said feed screw. By rotating the feed screw 37, the carriage 20 may be moved forwardly and rearwardly across the base 11, correspondingly moving the follower rod 19 across the cam surface of the cam 18 to secure any desired path of travel of said follower rod on said cam surface.

Figure 3:
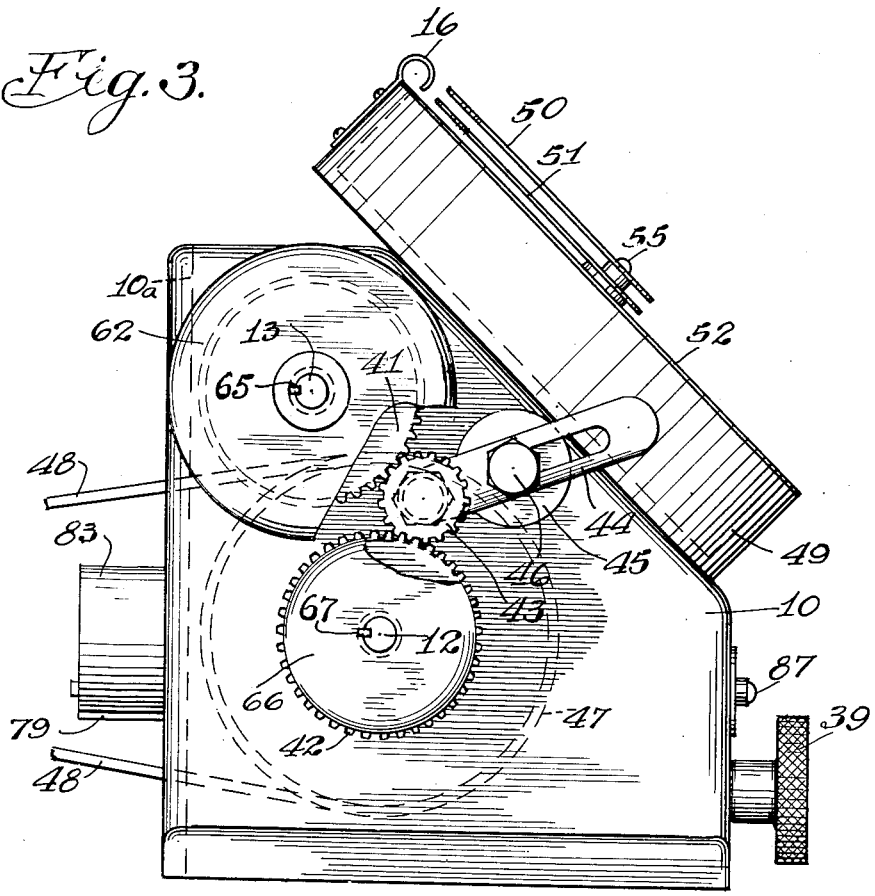
Fig. 3 is a left hand end elevation of the housing of the machine.

As shown in Fig. 3, the winding shaft 13 carries a gear 41 and the cam shaft 12 carries a gear 42, which gears mesh with an idler gear 43 carried by an arm 44 supported in a guide block 45 secured to the housing by a screw 46. Where a double traverse of the winding wire 34 across the coil 16 being wound, is desired per rotation of the winding spindle 14, the gear 41 is made a little larger or a little smaller, as preferred, than the gear 42, to avoid piling up the traverses of the winding upon each other, the amount of the difference in diameter of the two gears, determining the separation of each traverse angularly of the coil from the corresponding traverse of the next preceding similar turn of the winding. The cam shaft 12 carries in the housing 10, a pulley 47 engaged by a belt 48 to drive the machine from any suitable source of power, not shown. The housing 10 is provided with a removable back wall 10a, to afford ready access to the interior of the housing.

Operation of the machine as thus far described, results in the follower rod 19 moving first to the right and then to the left relatively to the carriage 20, and similarly moving the winding roller 33 relatively to the coil 16, for each rotation of the winding spindle 14, the amount of angular separation of corresponding traverses of the winding being determined by the difference in diameter of the gears 41 and 42, and the axial length of the coil 16 being determined by the location of the follower rod 19 radially of the cam 18. The cycle described is repeated until the coil 16 has the desired number of turns.

Figure 4:
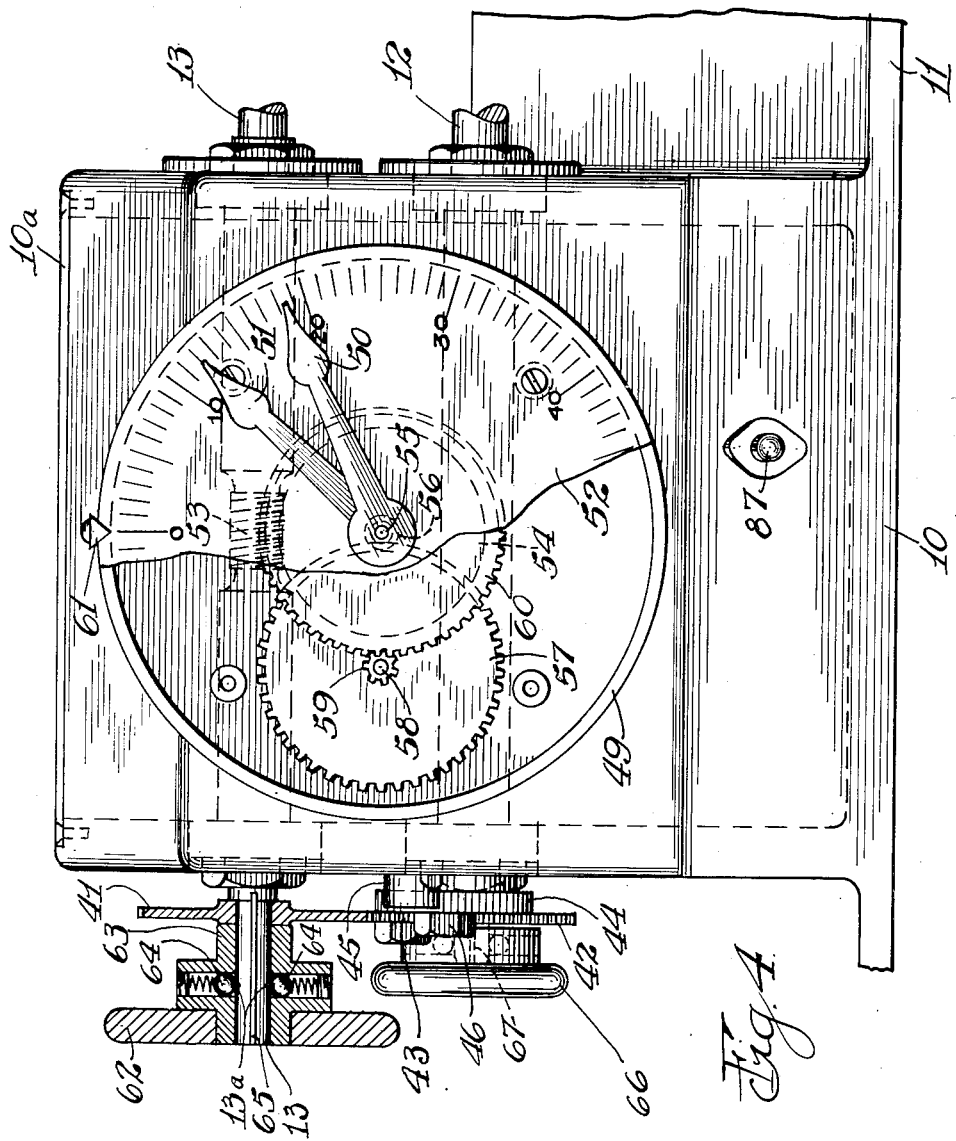
Fig. 4 is a plan view of the turn indicating mechanism of my machine, this view being taken along the line 4—4 in Fig. 2.

As shown in Fig. 4, the housing 10 carries a counter casing 49 containing gearing driving its "units" and "hundreds" pointers 50 and 51 for indicating by means of the dial 52, the number of hundreds of rotations of the winding shaft by the pointer 51 and the number of rotations of said shaft less than one hundred by the pointer 50, at any instant during a winding operation. The shaft 13 is provided with a screw thread 53 at its mid-portion, meshing with a worm wheel 54 carried by the inner end of the center spindle 55 which carries at its outer end the pointer 50, the number of teeth on the worm wheel 54 being such that each rotation of the shaft 13, advances the pointer 50 one division of the dial 52. The spindle 55 has secured thereto a pinion 56 meshing with a gear 57 mounted for rotation on a stud 58, on which stud a pinion 59 is also mounted and secured to the gear 57, said pinion 59 meshing with a gear 60 mounted for rotation coaxially with and independently of the spindle 55, said gear having connection with the pointer 51 to rotate the same. The connection between the pointers 50 and 51 and the spindle 55 and the gear 60 respectively, is frictional, permitting the pointers to be readily moved manually to their zero position on the dial represented by the fixed indicator 61, at the beginning of each winding operation.

As shown in Fig. 4, the winding shaft 13 extends beyond the gear 41, to receive a hand wheel 62 having a hub 63 provided with ball clutches 64 for engaging indentations 13a in the shaft 13 to hold the hand wheel in place on the shaft, and yet permitting its instant removal when desired, for example, to effect changes in the gear train connecting the shaft 13 with the shaft 12. Rotation of the hand wheel 62 on the shaft 13 is prevented by the feather key 65 which also engages the gear 41.

The cam shaft 12, extends beyond the gear 42 carried thereby and supports a hand wheel 66 in the manner described for supporting the hand wheel 62 on the shaft 13, a feather key 67 carried by the shaft 12 having engagement with the hand wheel 66 and the gear 42 and permitting their ready removal from said shaft to effect gear changes.

Figure 12:
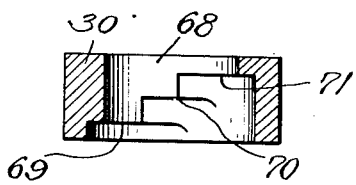
Fig. 12 is a horizontal, sectional view of a part of the structure shown in Fig. 11, taken along the line 12—12.

As shown in Fig 11, the spacing cam 30 is provided with a bore receiving the rod 21 with a sliding fit, to pivotally support said cam on said rod. Said cam is also provided with an arcuate slot 68 to clear the rod 19, which slot adjacent the sleeve 29, is recessed to receive the end of said sleeve, in the form of a series of steps 69, 70 and 71 at different positions axially of the cam 30, against one of which steps, according to the angular position of the cam, the adjacent end of said sleeve rests under the action of the spring 31, shown in Fig. 1. Said recess by its side engagement with the sleeve 29, limits angular movement of the cam 30 on the rod 21 in either direction. The cam 30 has formed on its outer edge, ratchet teeth 72 and 73 for engagement by a pawl 74 pivotally connected at 75 with the upper end of a lever 76 pivotally supported at its lower end at 77 by a bracket 78 carried by a horizontal plate 79 secured to and extending rearwardly from the carriage 20. An arm 74a extends upwardly from the pawl 74 to engage one end of a spring 80 the other end of which is connected with the lever 76 to hold said pawl against the upper edge of the cam 30. The mid-portion of the lever 76 is pivotally connected with one end of a link 81, the other end of which, as shown in Fig. 2, is pivotally connected with the core 82 of a solenoid 83 mounted on the plate 79, a spring 84 being mounted on said core to move the same to its outermost position when the solenoid is de-energized. The terminals of the winding of the solenoid 83 are connected by wires 85 and 86 with a push button 87, or equivalent circuit closer, mounted on the housing 10, and with one terminal of a source of current 88, the other terminal of which source is connected by wire 89 with said push button 87. As a result, operating the push button 87 energizes the solenoid 83, moves the core 82 and link 81 to the right as seen in Fig. 2 against the action of the spring 84, and moves the pawl 74 to the right to move the cam 30 angularly on the rod 21 a sufficient amount to move the one of the steps 69 and 70 on which the end of the sleeve 29 may be resting, from alignment with said sleeve, and to move the next lower one of said steps 70 or 71 as the case may be into alignment with said sleeve, at which time the spring 31 shown in Fig. 1, moves the sleeve 29 and the bracket 27 carried thereby, longitudinally of the follower rod 19, until the end of the sleeve 29 adjacent to the cam 30, rests upon said next lower step. A spring 90 is connected at its ends with the cam 30 and the carriage 20, to hold the cam 30 towards the front of the machine, as far as the engagement of the cam with the sleeve 29 will permit. The pitch distance of the teeth 72 and 73 is the same angularly, as the pitch distance of the steps 69, 70 and 71, and back movement of the cam 30 by the spring 90, when the pawl 74 is retracted by the spring 84, is prevented by the engagement of the edge surfaces of said steps with the side surface of the adjacent end of the sleeve 29. The relation of the steps 69, 70 and 71 of the cam 30 to each other, is more clearly shown in Fig. 12, the depths of said steps being the respective distances of similar portions of the sections of a wound coil, from each other axially.

In using the cam 30 to wind a coil in sections or in pi form, the follower rod 19 is moved horizontally across the end surface of the cam 18 by the hand knob 39, until the total cam rise at that adjustment, is equal to the desired axial length of each section of the coil, which, of course, cannot exceed the depth of the steps of the cam 30, and for any desired separation of said sections from each other, must be less than said depth by the amount of said separation. The sleeve 29 is then moved to engage the step 69, and the winding is begun. When the desired number of turns is wound on the first section as shown by the turn indicating mechanism, the operator presses the button 87 which at once moves the winding roller 33 along the core and starts the winding of the second section of the coil and so on, until all of the sections are wound, each with its desired number of turns, whereby a coil in pi form is produced without stopping the operation of the winding machine.

Where it is desired to wind a coil with a different traverse of the winding wire across the coil, than that above described, any desired relation may be secured by correspondingly changing the ratio of the gearing shown in Fig. 3, since by increasing the speed of the winding shaft 13 relatively to the speed of the cam shaft 12, so that the former rotates substantially faster than the latter, substantially less than a double traverse per turn of the coil will result, and by rotating the winding shaft 13 substantially slower than the cam shaft 12, as many traverses of the winding wire per turn of the coil, may be secured as desired.

It will also be observed that with a winding roller having a plurality of wire guiding grooves 33a and 33b as shown in Fig. 1, a corresponding plurality of coils may be simultaneously wound on the core 15, by supplying separate winding wires to the several winding grooves, which coils will have the same lengths axially, the same traverse, and if desired, the same numbers of turns, making it possible to produce coils having substantially identical electrical characteristics where the same diameter and kind of wire is used to wind the several coils.

While I have shown my invention in the particular embodiment above described, it will be understood that I do not limit myself thereto, as I may employ equivalents thereof known to the art at the time of the filing of this application, without departing from the scope of the appended claims.

Having thus described my invention, what I claim is:

1. In a machine for winding electrical coils, the combination of a winding spindle, a cam shaft, a cam carried by said cam shaft and having an end cam surface, a follower rod substantially parallel with said winding spindle and with the axis of said cam and in line with the end surface of said cam, means for holding said follower rod against said end cam surface, a wire guide carried by said follower rod and adjacent to said winding spindle for movement by said end cam surface from end to end of a coil being wound, said end cam surface having angularly spaced high and low portions engaging and reciprocating said follower rod by rotation of said cam, gearing connecting said winding spindle and said cam shaft to drive said winding spindle at a desired rate relatively to said cam, thereby effecting a corresponding amount of traverse of the winding wire on the coil being wound per rotation of said coil, and means for shifting said wire guide longitudinally on said follower rod for successive winding operations.

2. In a machine for winding electrical coils, the combination of a winding spindle, a cam shaft, a cam carried by said cam shaft and having an end cam surface, a follower rod substantially parallel with said winding spindle and with the axis of said cam and in line with the end surface of said cam, means for holding said follower rod against said end cam surface, a wire guide carried by said follower rod and adjacent to said winding spindle for movement by said end cam surface from end to end of a coil being wound, said end cam surface having angularly spaced high and low portions engaging and reciprocating said follower rod by rotation of said cam, gearing connecting said winding spindle and said cam shaft to drive said winding spindle at a desired rate relatively to said cam, thereby effecting a corresponding amount of traverse of the winding wire on the coil being wound per rotation of said coil, said end cam surface having a radial high line extending perpendicularly to its axis and on its opposite side a low line oblique to its axis and having also a continuous surface providing different axial displacements at different radial distances from its axis, and devices mounting said follower rod for movement towards and from the axis of the cam to selectively effect a desired amount of reciprocating movement of said follower rod.

3. In a machine for winding electrical coils, the combination of a winding spindle, a cam shaft, a cam carried by said cam shaft and having an end cam surface, a follower rod substantially parallel with said winding spindle and with the axis of said cam and in line with the end surface of said cam, means for holding said follower rod against said end cam surface, a wire guide carried by said follower rod and adjacent to said winding spindle for movement by said end cam surface from end to end of a coil being wound, said end cam surface having angularly spaced high and low portions engaging and reciprocating said follower rod by rotation of said cam, gearing connecting said winding spindle and said cam shaft to drive said winding spindle at a desired rate relatively to said cam, thereby effecting a corresponding amount of traverse of the winding wire on the coil being wound per rotation of said coil, said end cam surface having a radial high line extending perpendicularly to its axis and having also a radial low line oblique to its axis and extending from said high line to the opposite edge of said cam surface, said cam surface increasing in height in each direction angularly from said low line to said high line proportionally to the angular displacement from said low line and being continuous and providing different axial displacements of said surface at different radial distances from its axis, and devices mounting said follower rod for movement radially of said cam to selectively effect a desired amount of longitudinal movement of said follower rod equal to the selected axial displacement of said cam surface.

4. In a machine for winding electrical coils, the combination of a winding spindle, a cam shaft, a cam carried by said cam shaft and having an end cam surface, a follower rod substantially parallel with said winding spindle and with the axis of said cam and in line with the end surface of said cam, means for holding said follower rod against said end cam surface, a wire guide carried by said follower rod and adjacent to said winding spindle for movement by said end cam surface from end to end of a coil being wound, said end cam surface having angularly spaced high and low portions engaging and reciprocating said follower rod by rotation of said cam, gearing connecting said winding spindle and said cam shaft to drive said winding spindle at a desired rate relatively to said cam, thereby effecting a corresponding amount of traverse of the winding wire on the coil being wound per rotation of said coil, said end cam surface having different total displacements axially at different locations radially of its surface, and devices mounting said follower rod for movement radially of said end cam surface and selectively to different operating positions thereon.

5. In a machine for winding electrical coils, the combination of a winding spindle, a cam having high and low portions, a follower rod held in engagement with said cam, a wire guide carried by said rod for movement thereby axially across a coil being wound, gearing connecting said spindle and said cam for operation in a desired ratio, thereby effecting a traverse of the winding wire across the coil being wound corresponding to said ratio, said cam having different total displacements at different locations on its surface, and means mounting said follower rod for movement selectively to different operating positions on said cam.

6. In a machine for winding electrical coils, the combination of a winding spindle, a cam having high and low portions, a follower rod held in engagement with said cam, a wire guide carried by said rod for movement thereby axially across a coil being wound, gearing connecting said spindle and said cam for operation in a desired ratio, thereby effecting a traverse of the winding wire across the coil being wound corresponding to said ratio, said cam having different total displacements at different paths of travel thereon, the cam displacement at each of said paths increasing along said path proportionally to displacement of the cam from the low portion of said path, and means for moving said follower rod laterally to any desired one of said paths and holding said rod on said selected path of travel.

7. In a machine for winding electrical coils, the combination of a winding spindle, a cam having high and low portions, a follower rod held in engagement with said cam, a wire guide carried by said rod for movement thereby axially across a coil being wound, gearing connecting said spindle and said cam for operation in a desired ratio, thereby effecting a traverse of the winding wire across the coil being wound corresponding to said ratio, and means for shifting said wire guide longitudinally on said follower rod for successive winding operations.

8. In a machine for winding electrical coils, the combination of a winding spindle, a cam shaft, a cam carried by said cam shaft and having an end cam surface, a follower rod substantially parallel with said winding spindle and with the axis of said cam and in line with the end surface of said cam, means for holding said follower rod against said end cam surface, a wire guide carried by said follower rod and adjacent to said winding spindle for movement by said end cam surface from end to end of a coil being wound, said end cam surface having angularly spaced high and low portions engaging and reciprocating said follower rod by rotation of said cam, gearing connecting said winding spindle and said cam shaft to drive said winding spindle at a desired rate relatively to said cam, thereby effecting a corresponding amount of traverse of the winding wire on the coil being wound per rotation of said coil, and devices for shifting said wire guide desired amounts on said follower rod, whereby coils may be wound axially displaced respectively by said amounts.

9. In a winding machine, the combination of a winding spindle, a rod having periodic movement axially of said spindle, a wire guide carried by said rod adjacent to said spindle, a cam movable with said rod and controlling the position of said wire guide thereon, means for holding said wire guide against said cam, and devices for moving said cam to move said wire guide on said rod.

10. In a winding machine, the combination of a winding spindle, a rod having periodic movement axially of said spindle, a wire guide carried by said rod adjacent to said spindle, a cam movable with said rod and controlling the position of said wire guide thereon, means for holding said wire guide against said cam, and devices for moving said cam to move said wire guide on said rod, said cam having ratchet teeth for moving it, and said devices comprising a pawl engaging said teeth and electromagnetic mechanism for operating said pawl.

11. In a winding machine, the combination of a winding spindle, a rod having periodic movement axially of said spindle, a wire guide carried by said rod adjacent to said spindle, a cam movable with said rod and controlling the position of said wire guide thereon, means for holding said wire guide against said cam, and devices for moving said cam to move said wire guide on said rod, said cam having ratchet teeth for moving it, and said devices comprising a pawl engaging said teeth and electromagnetic mechanism for operating said pawl, said cam having a plurality of steps displaced axially of said rod for successively engaging said wire guide, whereby the successive coils are displaced axially by the amounts respectively of said axial displacement of said steps.

12. In a winding machine, the combination of a winding spindle, a rod having periodic movement axially of said spindle, a wire guide carried by said rod adjacent to said spindle, a cam movable with said rod and controlling the position of said wire guide thereon, means for holding said wire guide against said cam, and devices for moving said cam to move said wire guide on said rod, said cam having ratchet teeth for moving it, and said devices comprising a pawl engaging said teeth and electromagnetic mechanism for operating said pawl, said cam having a plurality of steps displaced axially of said rod for successively engaging said wire guide, whereby the successive coils are displaced axially by the amounts respectively of said axial displacement of said steps, the engagement of said wire guide with each of said steps holding said cam against back movement.

13. In a machine for winding coils, the combination of a winding spindle, a cam having high and low portions, means for driving said spindle and said cam, a follower rod held in engagement with said cam and movable longitudinally thereby, a wire guide mounted on said rod for longitudinal movement therewith, whereby the movement of said wire guide longitudinally of said spindle may be in the same direction and of the same extent as the longitudinal movement of said follower rod by said cam, said cam having paths of different amounts of displacement, and adjustable means supporting said follower rod for movement into alignment with a desired one of said cam paths.

FREDERICK N. JACOB.